Sept. 23, 1930.  A. G. RONNING  1,776,374
COMBINATION LAND AND AIR MACHINE
Filed Oct. 14, 1927  6 Sheets-Sheet 4

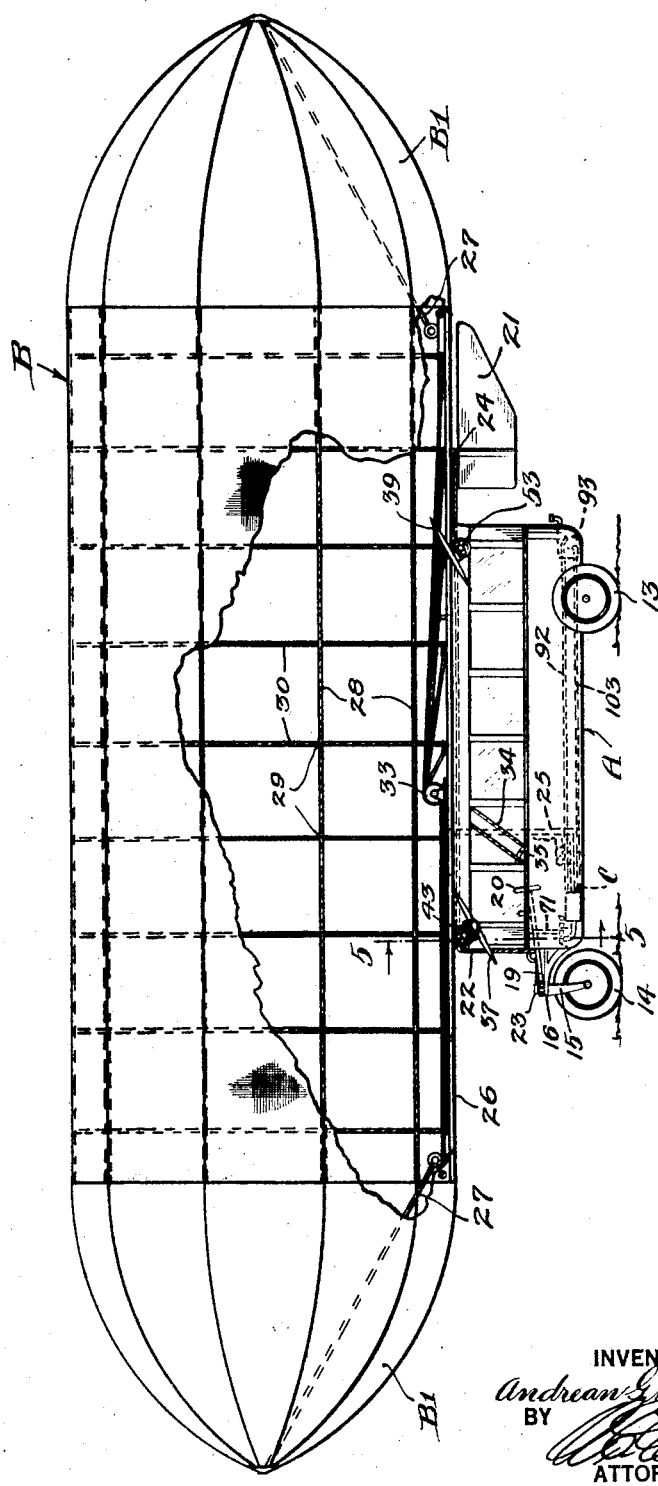

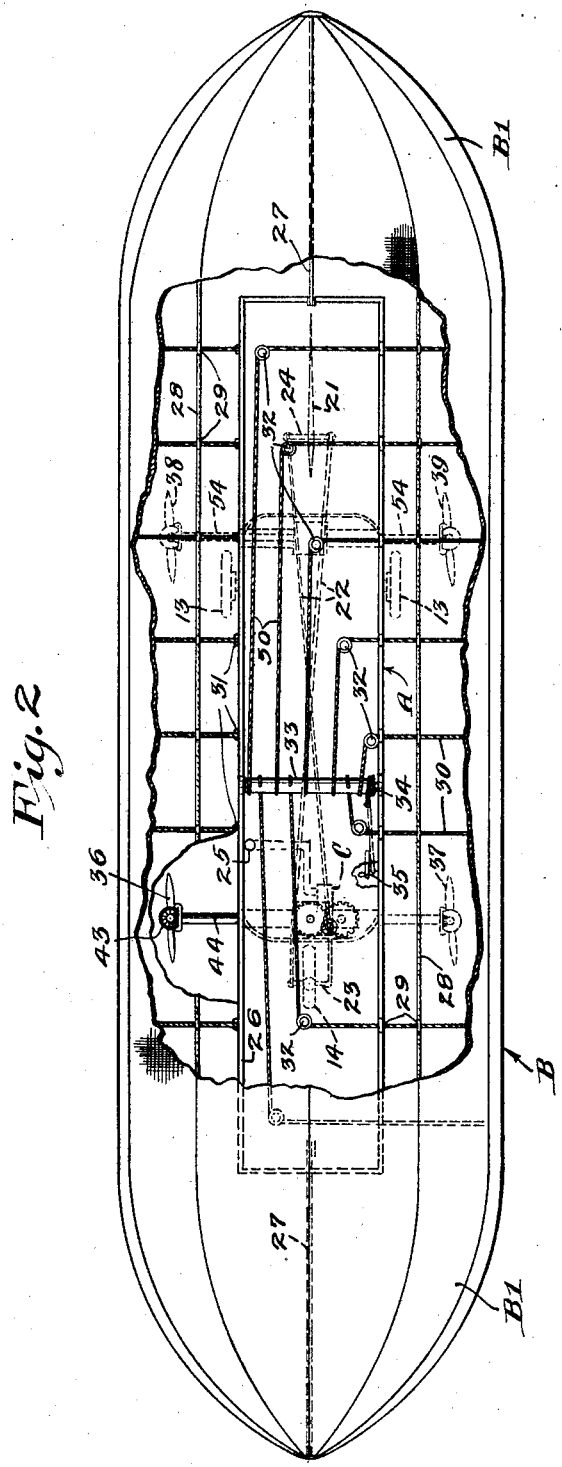

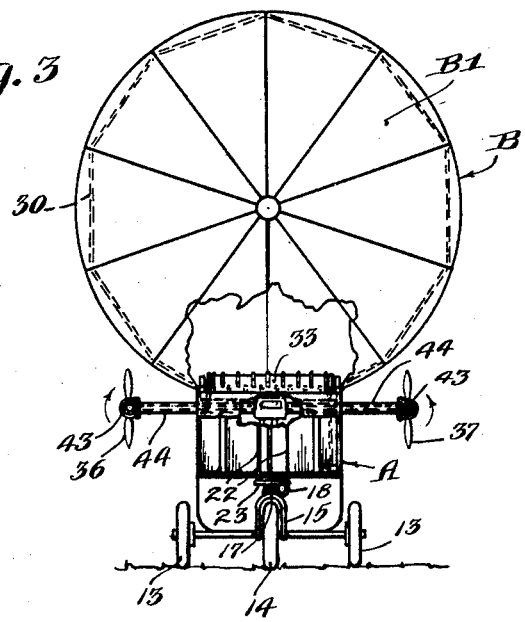
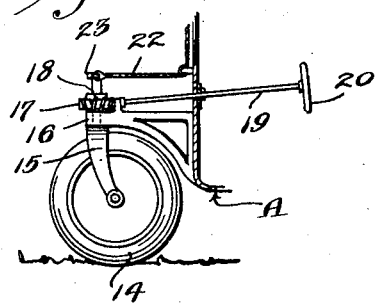

Inventor
Andrean G. Ronning
By his Attorney

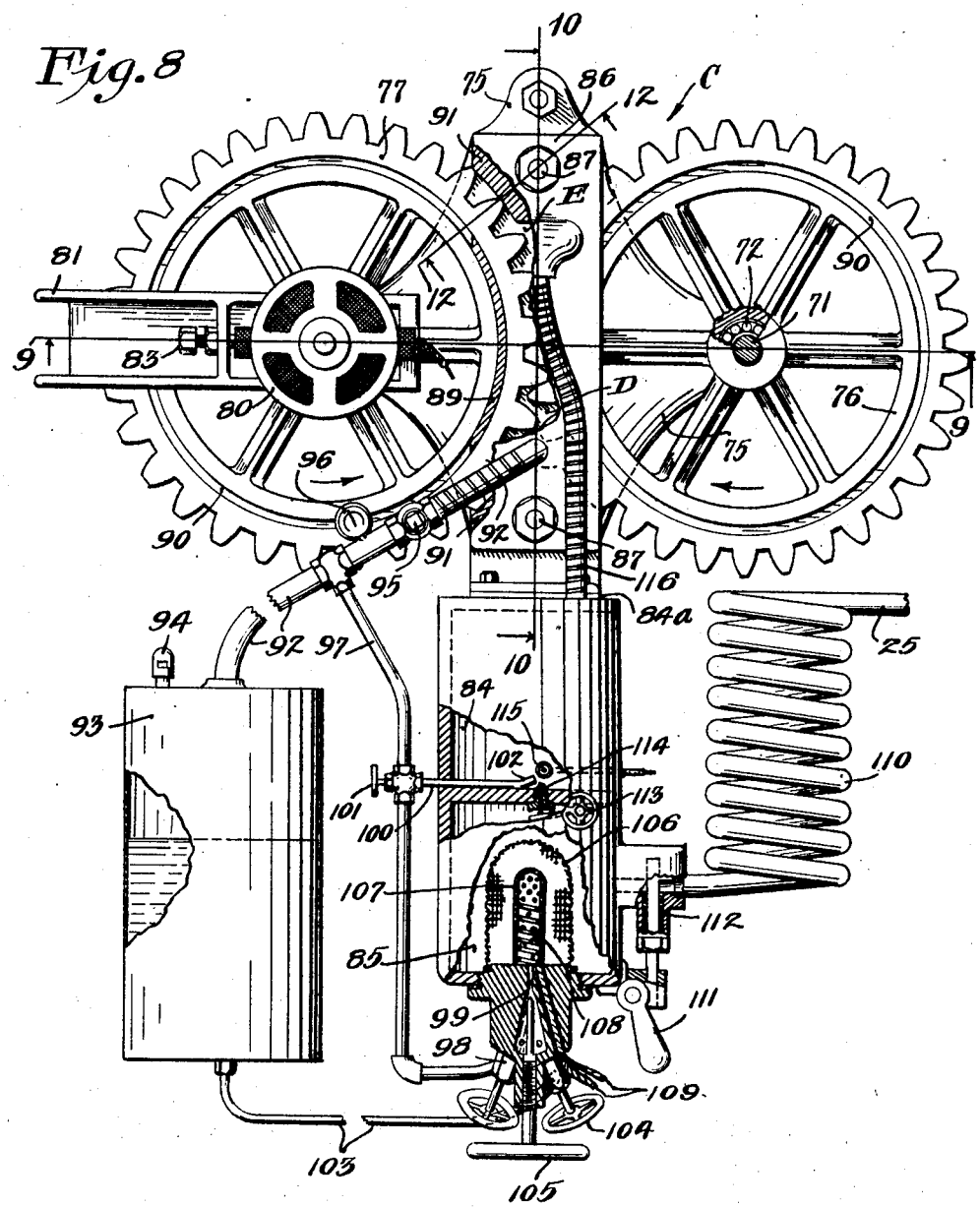

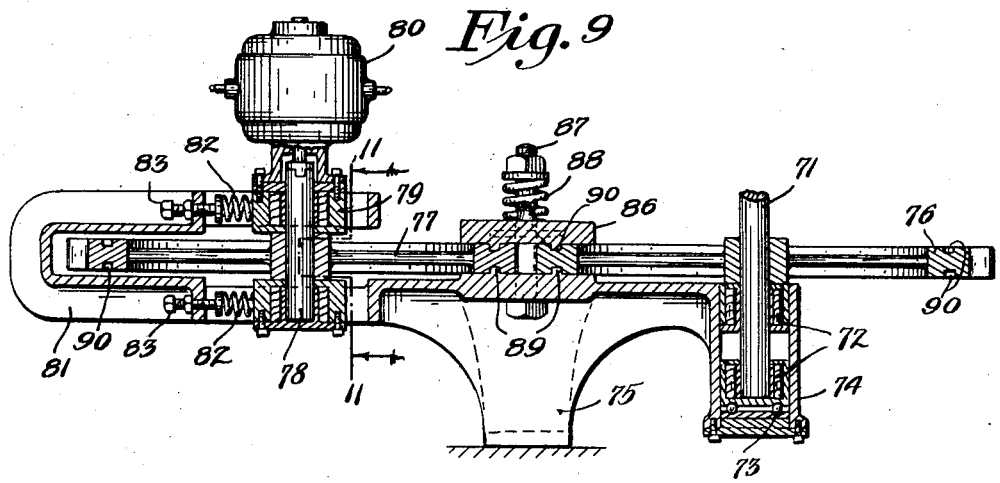
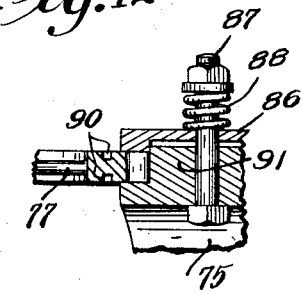
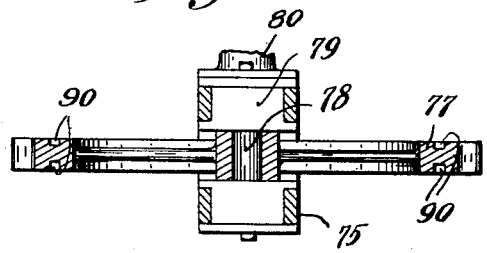
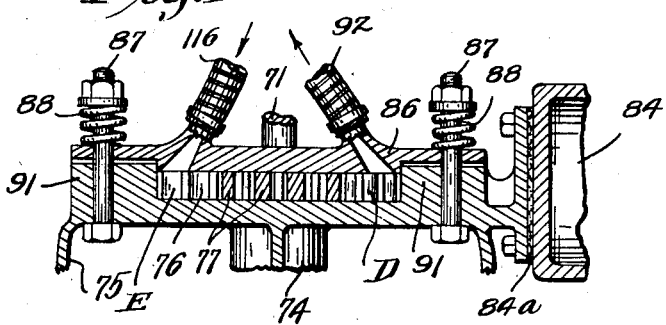

Patented Sept. 23, 1930

1,776,374

UNITED STATES PATENT OFFICE

ANDREAN G. RONNING, OF MINNEAPOLIS, MINNESOTA; JACOB A. RONNING AND ADOLPH RONNING EXECUTORS OF SAID ANDREAN G. RONNING, DECEASED

COMBINATION LAND AND AIR MACHINE

Application filed October 14, 1927. Serial No. 226,199.

This invention relates to combination land and air vehicles, and the primary object is to provide a vehicle of that nature which is efficient, practical, and comparatively simple; which is capable of travelling and being effectively driven, steered, and controlled whether operated on land, or in the air. A further object is to provide a machine of the universal nature noted, that is extremely compact in its construction, and is economically built, whereby it may be made attractive and safe as a popular medium of transportation for passengers as well as freight, and which can be manipulated and controlled by any person having a rudimentary knowledge of aerial and land navigation rules. A further object is to provide aerial lifting power of the dirigible nature, whereby only a minimum amount of road or land surface is required for landing, and taking off into the air, and to so construct the dirigible portion of the machine that it may be collapsed, when it is desired to station the machine in a garage, hangar or building which is to be used for housing the machine when it is not in active use. A further object is to provide means of a novel, efficient, and practical nature for steering and controlling the machine. A still further object is to provide an improved and highly novel type of power unit and gas producing apparatus. Still further and more specific objects will be disclosed in the course of the following specification, reference being had to the accompanying drawings, wherein:

Fig. 1 is a side elevation of the machine, portions of the dirigible unit of which are broken away for purpose of illustration.

Fig. 2 is a plan view of the machine, in which also, a large central portion of the machine is broken away for illustration purposes.

Fig. 3 is a front end elevation of the machine, with a portion broken out.

Fig. 4 is a slightly enlarged, detail view, partly in section, of the front steering unit.

Fig. 8 is a plan view of the power and gas supplying unit, with various parts broken away and others shown in section for purpose of illustration.

Fig. 9 is a sectional elevation on the line 9—9 in Fig. 8.

Fig. 10 is a sectional elevation on the line 10—10 in Fig. 8.

Fig. 11 is a sectional elevation about as on the line 11—11 in Fig. 9.

Fig. 12 is a detail elevation, as on the section line 12—12 in Fig. 8.

Figure 5:
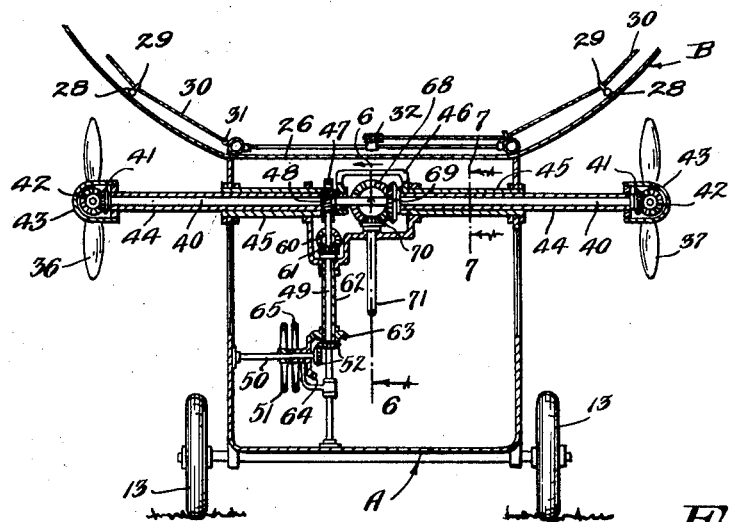
Fig. 5 is an enlarged detail section about as on the line 5—5 in Fig. 1.
Figure 7:
Fig. 7 is an enlarged detail section on the line 7—7 in Fig. 5.

Referring to the drawings more particularly and by reference characters, A designates the main carriage or sedan body of the machine, and is provided with suitable accommodations (not here detailed) for passengers and freight to be transported. When on the ground this carriage is supported by a pair of rear drive wheels 13 and a front wheel 14. The wheels 13 may be power driven as in an automobile, if desired, but in the present instance they are merely idle supporting wheels, movement of the machine being effected by propellers, later to be described. The wheel 14 is carried in a fork 15 that swivels in a bracket 16 at the front end of the machine. The fork 15 has a worm gear 17 meshing with a worm 18 on the front end of a shaft 19 which projects to the driver's position, where it is provided with a steering wheel 20. It may here be noted that the center of the wheel 14 is rearwardly offset from the vertical pivot center of the fork, and that the pitch of the worm 18 is sufficiently great that it will not prevent the wheel 14 from having a caster action when the hand wheel 20 is free to rotate. On the other hand, the wheel 20 may be used to steer the wheel 14 when the machine is on the ground, and is also used to steer the machine when it is in the air, as it controls the wheel 14 and a rudder 21, both of which effect a lateral wind resistance when the machine is in motion. To properly accomplish this the members 14 and 21 must angle in opposite directions, and this is made possible by a pair of crossed cables 22 that connect cross bars 23 and 24, respectively, of the fork 15 and rudder 21. The cables are run over suitable pulleys in their course between the two ends of the machine.

The machine is raised and retained in the air primarily under the influence of an inflatable and collapsible dirigible unit B, the inflating and collapsing operations of which are entirely controlled from within the sedan A and by the operator of the machine. The bag B is supplied with hydrogen gas, from the power unit, through a pipe 25, and is securely fastened to a platform 26 forming the roof proper of the body or carriage A.

The dirigible is made of balloon silk or other suitable flexible fabric, and is cylindrical throughout its greater central portion, while the end sections B¹, which extend beyond the limits of the platform or frame 26 are tapered in toward the common axis in the usual way. The extreme ends of the bag are connected to the frame 26 by link rods 27, so that when the bag is deflated the the sections B¹ may be swung in over the frame 26 and upon the central portion of the bag.

The dirigible bag B is provided upon its inner surface with longitudinally extending, annularly spaced, and preferably flexible, reinforcing ribs or seams 28, each of which is provided with a plurality of rings, pulleys, or eyelets 29. These devices 29 are arranged in annular series, and each group or series slidably receives a cable or rope 30. The corresponding ends of the cables 30 are permanently secured, as at 31, to one side of the frame 26, while the opposite ends, after being threaded through the eyelets 29 pass around pulleys 32 and fasten, at spaced intervals, upon a transversely positioned spool or drum 33. When the dirigible expands, under the influence of the inflating gas, the cables 30 unwind from the drum 33, as fast as the gas is injected and the resistance to the roller or drum 33 permits. This resistance is effected by a cable 34, that is wound upon the drum and extends into the cabin or pilot house A where it is manually controlled under the operation of a hand wheel 35. This wheel is also employed to reduce the radius of the bag, when necessary, by operating the drum and thus pulling in all the cables 30 to gather in the bag material. This same operation eliminates the necessity of allowing the gas to escape into the atmosphere, by forcing it back through the pipe 25 to the engine where it may be used as fuel to run the engine, later to be described.

The machine is propelled through the air or over the road or land, by a series of air propellers 36, 37, 38 and 39, which are simultaneously driven, but whose operating planes are subject to adjustment about fixed transverse centers, so as to control their lifting, driving and fore and aft stabilizing characteristics.

The front propellers 36 and 37, are driven by a shaft 40, that extends, transversely, entirely across the machine, and has bevel pinions 41, at its ends, that mesh with and drive bevel pinions 42 of the propellers (see Fig. 5). The propeller pinion units 36—42 and 37—42, are journaled in heads 43 at the outer ends of sleeves 44, and the sleeves 44 are journaled to rotate or oscillate, under manual control, in a pair of sleeve bearings 45 fixed in the car body. The inner ends of the sleeves 44 are connected by a bridge member 46, so that they will turn or oscillate in unison. The sleeves are thus oscillated, by a worm gear 47, secured on the right hand sleeve, and which meshes with and is driven by a worm 48 of a vertical shaft 49. This shaft is in turn operated by a shaft 50, having a hand wheel 51, and which drives the vertical shaft 49 through a pair of intermeshing bevel pinions 52.

Figure 6:
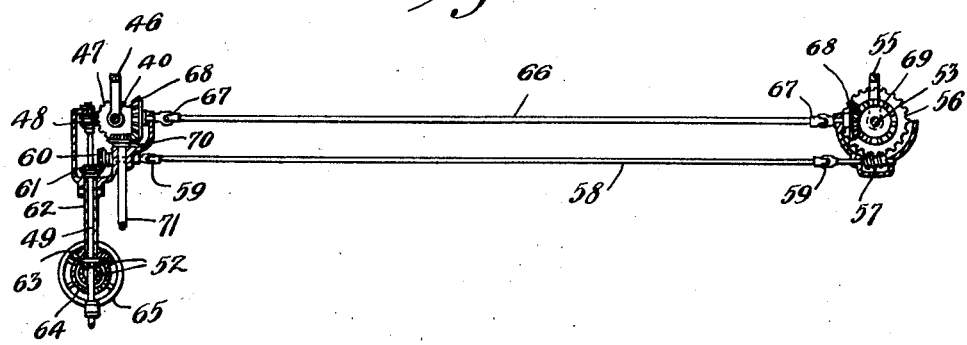
Fig. 6 is a sectional elevation of the front and rear propeller drive connections, as seen approximately on the line 6—6 in Fig. 5.

The rear propellers 38—39, are driven by a similar transverse shaft 53, and are angularly controlled by the oscillation of sleeves 54, connected by a spanning yoke or bridge 55. One of the sleeves 54 (as in front) has a worm gear 56, driven by the worm 57, of a longitudinally extending shaft 58 (see Fig. 6). This shaft which is preferably provided with universal joints 59, has a bevel pinion 60 at its forward end, that meshes with and is operated by a similar pinion 61 carried at the upper end of a sleeve 62, that surrounds the shaft 49. The lower end of the sleeve 62 has a bevel pinion 63 that meshes with a bevel gear 64 having a hand wheel 65.

It will thus be seen that by manipulating the hand wheel 51 the operator is able to vary the inclination of the plane of operation at the front propellers 36—37, thereby adjusting their lifting power and effecting forward propelling thrust as may be desired. By manipulating the hand wheel 65 he is similarly able to independently regulate the rearwardly disposed propellers 38—39. The independence of these controls is significant and important as it enables the operator to maintain the horizontal keel of the machine even when the load is unevenly distributed and weather conditions are unfavorable. And with the fore and aft propellers properly synchronized or balanced, the operator has only to grip over and turn both wheels 51 and 65, to regulate the speed or altitude of the machine as a unit.

The propeller shafts 40 and 53 are simultaneously driven by a longitudinally extending shaft 66, having universal joints 67, and bevel gears 68 that mesh with bevel gears 69 on the propeller shafts. The shaft 66 is in turn driven, through its front bevel gear 68, by an intermeshing bevel pinion 70, on a shaft 71 that extends up from the power unit C, now to be described.

The power and gas creating unit C, as indicated in Figs. 1 and 2, is preferably arranged in the forward end of the car body proper.

The lower end of the shaft 71 is journaled in roller bearings 72, and rests on thrust bearings 73 in a bearing box 74, carried on a base member or main frame 75. The shaft 71 is driven by a large spur gear 76 that meshes with a similar gear 77 on a stub shaft 78. The shaft 78 is journaled in a bearing block 79 that also supports a generator 80. The bearing block is slidably arranged in the V-shaped yoke extension 81, of the base 75, and is spring held (toward the right, in Fig. 9) by springs 82 and set screws 83, so that the gears 76 and 77 will always be held tightly in mesh. The generator 80 is primarily employed to supply current to, or to charge a battery (not shown), for the ignition system to supply ignition sparks or electric heat in the chambers 84 and 85.

A rectangular plate 86 is placed over the adjoining sections of the gears 76 and 77, and is firmly pressed down upon the same, by bolts 87 having compression springs 88, thus firmly holding the gears in close contact with the members 76 and 86. To further seal these contacts I provide the last mentioned members with ribs 89 which engage in grooves 90 in the gears. As the teeth of the gears approach each other they close with or against a post or end wall 91, of the base 75, with a result that a confined chamber D is formed by the two gears, and between the wall 91 and the median line between the gears. It will now be seen that as the gears rotate, in the direction of the arrows, the spaces between the teeth will cause small charges of air to be passed into the chamber D, and, as the gears then mesh the teeth of each gear will displace the air charges in the spaces of the other gear, with a result that the air in the chamber D is constantly being replenished and compressed, and under such pressure can only escape through a conduit 92 that leads to the fuel tank 93. The fuel tank is thus always under pressure, as is required in this power unit, but a pressure release valve 94 is provided as a safety measure. A check valve 95 is provided in the conduit 92, to prevent a back pressure in the chamber D, and the conduit is preferably also provided with a gauge 96, whereby the pressure in the system may be observed at any time.

The conduit 92 has a branch pipe 97 which supplies air under pressure to the needle valve 98 of a burner nozzle 99, of the Diesel type, and a branch 100, controlled by a valve 101 supplies air under pressure to a nozzle 102.

A fuel pipe 103, connects the fuel tank 93 (preferably at the rear of the machine, as in Fig. 1), to a needle valve 104 of the nozzle 99. Thus, the mixture of air and gas may be regulated, as may be found necessary. The supply of fuel proper is regulated by a third needle valve 105.

At the outlet of the nozzle 99, I provide a burner mantle 106, and within the mantle is a fuel preheating device consisting of a perforated cup 107, about the inner surface of which is arranged a hot wire heating element 108, connected to the ignition wires 109. When the current is turned on the cup 107 becomes very hot, and ignites the combustible gases that are discharged from the nozzle 99, as such gases are ejected through the perforations in the cup. After the mantle 106 has become thoroughly heated, and combustion is complete, the current to the preheater may be switched off.

The mantle 106 is preferably of the so-called Welsbach type consisting of an asbestos woven fabric, formed of thorium dioxide $ThO_2$ ninety nine per cent, and cerium dioxide $(Ce.O_2)$, one per cent.

The hydrogen gas produced by the burner in the chamber 85 is that which is conducted to the dirigible through the pipe 25. This pipe is preferably provided with a cooling coil 110, and the gas flow, both to and from the dirigible is controlled by a gate valve 111. This valve is preferably provided with an asbestos or graphite packing 112.

When the dirigible has been properly and sufficiently filled with the light hydrogen gas, the valve 111 is closed, and a valve 113 is opened. This valve controls a nozzle 114 that is directed into the chamber 84, immediately adjacent to the air feed nozzle 102. As the hydrogen gases are injected, under high pressure, against the highly compressed air stream from the nozzle 102, the resulting mixture becomes combustible, and burns with an intense heat in the chamber 84, some means such as a spark plug 115 being employed to start the combustion. As the burning gases expand in the chamber 84, they are forced through a conduit 116, to a chamber E, which is substantially identical with the previously described chamber D, but instead of being a compression chamber fed by the gears, it is an expansion chamber in which the expansive characteristics of the gases are utilized to drive the gears by an operation, which is just the reverse of that in the chamber D.

When the dirigible is to be deflated, the valve 105 may be closed, and the valves 111 and 114 opened, so that when the dirigible is closed together the gases will be forced back and into the chamber 84 and burned. The resulting power may be used to run the machine on the ground, or store up air pressure and generated electricity.

It is understood that suitable modifications may be made in the general design and structural details of the invention herein shown, and described, provided, however, that said modifications come within the spirit and scope of the appended claims. Having now therefore fully shown and described my invention, what I claim to be new and desire to protect by Letters Patent is:

1. A machine of the character described, comprising an inflatable bag having an under-carriage, and means, extending to and operative from the carriage, for gathering in the bag when the same is to be deflated, said means consisting of a plurality of cables extending circumferentially about the interior of the bag and connected thereto at spaced points.

2. A machine of the character described comprising an inflatable bag having an under-carriage, secured thereto, means for radially gathering in the body of the bag, and pivoted link members extending to the extreme ends of the bag, whereby the end portions of the bag may be folded in upon the body portion proper when the bag is deflated.

3. A machine of the character described comprising an inflatable bag, spaced guides distributed over and secured to the inner surface of the bag, and circumferentially extending cables extending about the interior of the bag and slidable in said guides, for gathering the bag together.

4. A machine of the character described comprising an inflatable bag, a series of draw cables, longitudinally spaced within the bag, and extending entirely around the inner circumference thereof, and slidably secured thereto, for gathering the bag.

5. In a machine of the character described, an elongated inflatable bag having an under-carriage, and link rods extending from the extreme ends of the bag to intermediate points therewithin, to aid in folding end portions of the bag in upon itself when deflated.

6. In a machine of the character described, an elongated inflatable bag having an under-carriage, and link rods extending from the extreme ends of the bag to intermediate points therewithin, to aid in folding end portions of the bag in upon itself when deflated, and gathering cables extending about the inner circumference of the bag to radially gather the same inwardly.

In testimony whereof I affix my signature.

ANDREAN G. RONNING.